Patented Oct. 23, 1928.

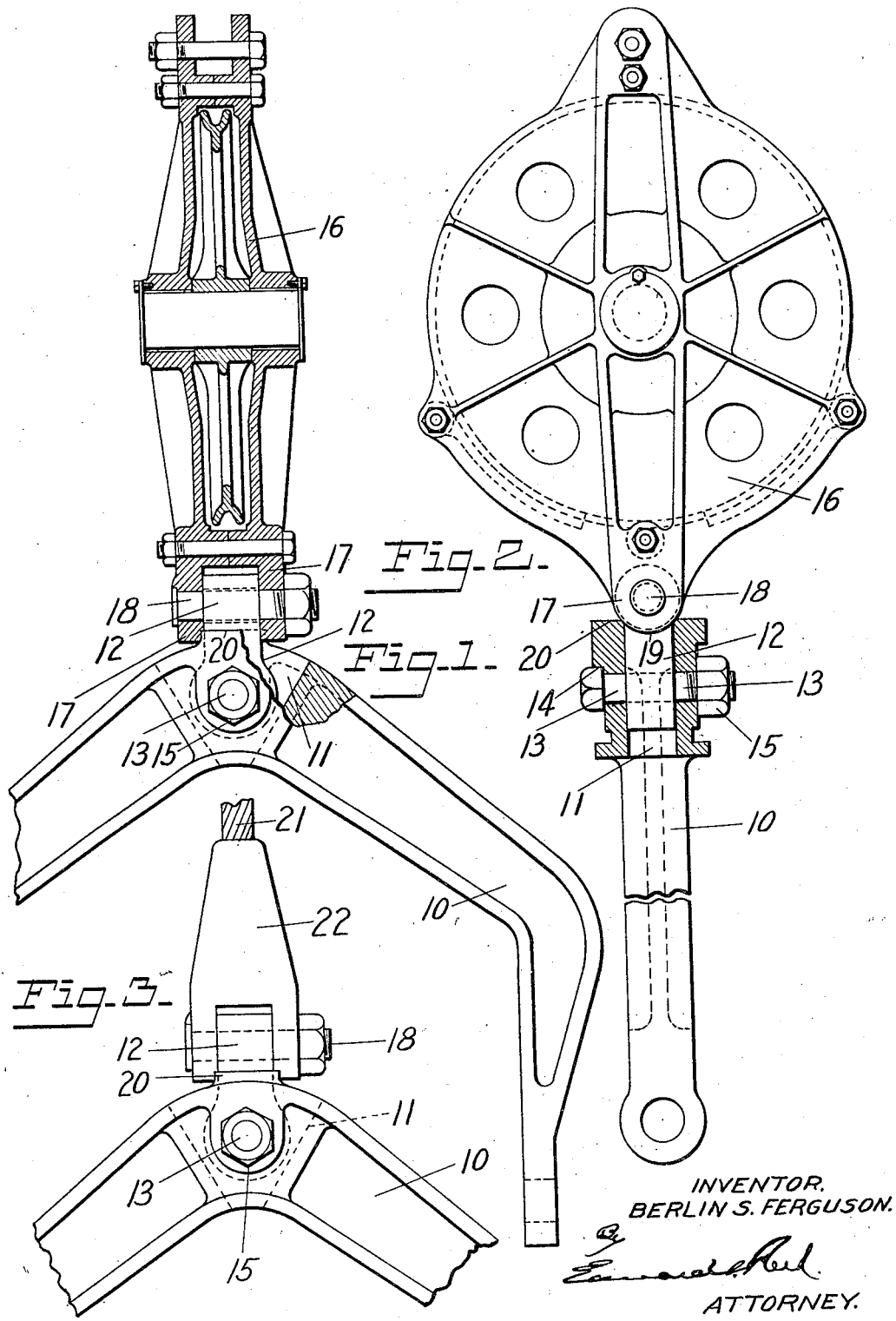

1,689,122

UNITED STATES PATENT OFFICE.

BERLIN S. FERGUSON, OF MARION, OHIO, ASSIGNOR TO THE MARION STEAM SHOVEL COMPANY, OF MARION, OHIO, A CORPORATION OF OHIO.

BAIL FOR EXCAVATING DIPPERS AND THE LIKE.

Application filed July 22, 1926. Serial No. 124,174.

This invention relates to bails for excavating dippers and the like and more particularly to the means for connecting such a bail with a supporting member or cable.

One object of the invention is to provide such a connection which will be of a very strong durable construction and will not be liable to be injured by the severe strains to which it is subjected.

A further object of the invention is to provide such a device which will be simple in its construction and operation and which can be produced at a relatively low cost.

Other objects of the invention will appear as the device is described in detail.

In the accompanying drawings Fig. 1 is a side elevation of a bail showing my invention applied thereto, with the sheave in section; Fig. 2 is a sectional view taken through the connecting device and showing the sheave in elevation; and Fig. 3 is a side elevation of a slightly modified form of the invention.

In these drawings I have illustrated certain embodiments of my invention and have shown the same as applied to a bail of an excavating dipper, such as is commonly employed in connection with power shovels but it will be understood that the device may take various forms and may be applied to bails of various kinds or to other similar devices without departing from the spirit of the invention.

In the particular embodiment here illustrated the invention is applied to a bail 10 which is substantially U-shaped in form and has the lower ends of its side arms apertured to provide means for connecting the same with a dipper. The transverse portion of the bail is provided near its center with a socket 11 which may be formed therein in any suitable manner, as by casting or forging. In the particular device here shown the socket extends entirely through the transverse portion of the bail and the end walls thereof diverge upwardly so that the socket is of materially greater length at its top than at its bottom. Pivotally mounted within the socket is a connecting member which is here shown as a link 12, the lower portion of which fits snugly between the side walls of the socket but which is free for pivotal movement within the socket. A bolt 13 extends through the side walls of the socket and through the connecting member to pivotally connect the latter with the socket. One outer wall of the socket is provided with a lug 14 to engage the head of the bolt and hold the latter against rotation and the nut 15 on the other end of the bolt not only serves to retain the bolt in position but cooperates with the head of the bolt to hold the side walls of the socket against spreading or distortion. The upper end of the connecting member extends above the socket and is adapted for connection with the supporting member or cable. In that form of the device shown in Figs. 1 and 2 the connecting member is connected with the cable through the medium of the sheave block 16. This sheave block has downwardly extending lugs 17 which embrace the upper portion of the connecting member 12 and which are pivotally connected with the connecting member by means of a bolt 18. The bolt 18 extends at substantially right angles to the bolt 13 and consequently the connecting member has movement with relation to the bail about an axis extending transversely to the bail while the sheave block has movement with relation to the connecting member about an axis at substantially right angles to the first mentioned axis, thus enabling the connecting member to accommodate itself to the shifting positions of the bail and sheave block. As here shown the lower ends of the lugs 17 on the sheave block are rounded, as shown at 19, and extend for a limited distance between the side walls of the socket, the latter being in the present instance, provided with upwardly extending portions 20 which are engaged by the edges of the lugs. The lugs do not necessarily contact with the edges of the side walls of the socket and when they do engage the same the contact is not such as to interfere either with the movement of the connecting member about its axis or with the movement of the sheave block about its pivotal connection with the connecting member.

In an installation employing a single line hitch the connecting member may be attached directly to the cable without the interposition of the sheave. In Fig. 3 of the drawings I have shown a cable 21 having secured to the end thereof a cable socket 22 which is connected with the connecting member, which is mounted in the bail in the manner above described. Preferably the connection between the cable socket and the connecting member is a pivotal one and the axis thereof is at right angles to the axis of the pivotal connection between the connecting member and the bail. The flexibility of the connection thus provided relieves the cable of severe bending strains at the point where it leaves the cable socket.

The construction herein described provides a connection between the bail and the cable which is of a very strong durable character and in which the bail itself is not weakened. The construction is very simple and may be produced at a low cost; the cable may be quickly and easily attached to or disconnected from the bail.

While I have shown and described certain embodiments of my invention I wish it to be understood that I do not desire to be limited to the details thereof as various modifications may occur to a person skilled in the art.

Having now fully described my invention what I claim as new and desire to secure by Letters Patent is:

1. In a device of the character described, a bail having a socket formed in the transverse portion thereof and opening through the upper edge of the same, and a connecting member pivotally mounted in said socket and extending above the same for connection with a supporting member.

2. In a device of the character described, a bail having a socket, the end walls of which diverge upwardly and a connecting member having a portion extending into said socket and fitting snugly between the side walls thereof and having another portion extending above said socket for connection with a supporting member.

3. In a device of the character described, a bail having a socket formed in the transverse portion thereof and opening through the upper edge of the same, a connecting member mounted in said socket and extending above the same for connection with a supporting member, and a device to pivotally support said connecting member in said socket and having means to prevent the distortion of the side walls of said socket.

4. In a device of the character described, a bail having a socket, a connecting member mounted in said socket and extending above the same for connection with a supporting member, a bolt extending through the side walls of said socket and through said connecting member, a nut mounted on said bolt and serving to retain said bolt in position and cooperating with the head of said bolt to prevent the distortion of the side walls of said socket, one wall of said socket having a lug to engage the head of said bolt and hold the latter against rotation.

5. In a device of the character described, a bail having a socket formed in the transverse portion thereof and opening through the upper edge of the same, a connecting member pivotally mounted in said socket, and a sheave pivotally connected with the upper end of said connecting member for movement relatively thereto about an axis transverse to the axis of the pivotal connection between said connecting member and said socket.

6. In a device of the character described, a bail having a socket formed in the transverse portion thereof and opening through the upper edge of the same, a connecting member mounted in said socket for pivotal movement about an axis extending transversely to said bail, the upper end of said connecting member extending above said socket, a sheave block having lugs embracing the upper end of said connecting member, and means for pivotally connecting said lugs to said connecting member on an axis extending transversely to the first mentioned axis.

7. In a device of the character described, a bail having a socket, a connecting member mounted in said socket for pivotal movement about an axis extending transversely to said bail, the upper end of said connecting member extending above said socket, a sheave block having lugs embracing the upper end of said connecting member, and means for pivotally connecting said lugs to said connecting member on an axis extending transversely to the first mentioned axis, said lugs having their lower portions rounded and extending between the upper portions of the side walls of said socket.

8. In a device of the character described, a substantially U-shaped bail, the transverse portion of which is provided near its center with a socket, the end walls of said socket diverging upwardly, a connecting member fitting snugly between the side walls of said socket, a bolt extending through the side walls of said socket and through the connecting member to pivotally support the latter, the upper end of said connecting member extending above said socket, a sheave block having lugs embracing the upper end of said connecting member, and a bolt extending through said lugs and through said upper end of said connecting member to pivotally connect the sheave block with said connecting member, the last mentioned bolt extending at substantially right angles to the first mentioned bolt.

9. In a device of the character described, a bail having a socket formed in the transverse portion thereof and opening through the upper edge of the same, a connecting member pivotally mounted in said socket, and a part pivotally connected with the upper end of said connecting member on an axis extending transversely to the axis of the pivotal connection between the connecting member and the bail, said part having means for attaching the same to a cable.

In testimony whereof, I affix my signature hereto.

BERLIN S. FERGUSON.